US008297655B2

(12) United States Patent
Ogawa et al.

(10) Patent No.: US 8,297,655 B2
(45) Date of Patent: Oct. 30, 2012

(54) FUEL TANK MOUNTING DEVICE AND AN INDUSTRIAL USE VEHICLE THEREWITH

(75) Inventors: Kiyomitsu Ogawa, Sagamihara (JP); Nobutaka Umezawa, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 138 days.

(21) Appl. No.: 12/666,691

(22) PCT Filed: Aug. 29, 2008

(86) PCT No.: PCT/JP2008/066016
§ 371 (c)(1),
(2), (4) Date: Aug. 2, 2010

(87) PCT Pub. No.: WO2009/081625
PCT Pub. Date: Jul. 2, 2009

(65) Prior Publication Data
US 2010/0283232 A1 Nov. 11, 2010

(30) Foreign Application Priority Data
Dec. 26, 2007 (JP) ................................ 2007-334332

(51) Int. Cl.
*B60P 3/22* (2006.01)
(52) U.S. Cl. ......................... 280/834; 280/830; 248/240
(58) Field of Classification Search .................. 280/830, 280/834; 248/240
See application file for complete search history.

(56) References Cited

U.S. PATENT DOCUMENTS 5,845,940 A * 12/1998 Colburn ........................ 280/830
6,637,706 B2 * 10/2003 Kim et al. ..................... 248/154
7,249,786 B2 * 7/2007 Mascarenhas et al. ....... 280/830
7,334,818 B2 * 2/2008 Mascarenhas et al. ....... 280/830
7,621,565 B2 * 11/2009 Ross et al. .................... 280/830

FOREIGN PATENT DOCUMENTS

JP 55-97164 U 7/1980
JP 2-33727 U 3/1990
JP 10-53033 A 2/1998
JP 11-336614 A 12/1999
JP 2003-118990 A 4/2003
JP 2007-169054 A 7/2007

* cited by examiner

*Primary Examiner* — Lesley D. Morris
*Assistant Examiner* — Michael Stabley
(74) *Attorney, Agent, or Firm* — Birch, Stewart, Kolasch & Birch, LLP

(57) ABSTRACT

A fuel tank mounting mechanism which enhances backward visibility of an operator and performs the loading/unloading work of a fuel tank by a single motion to improve replacement workability. In the mechanism for mounting a fuel tank (30) on a counterweight (8) provided in the rear of an industrial vehicle, the front upper surface of the counterweight (8) is dented to form a recess (9) for receiving the fuel tank (30) in the width direction of the body. The recess (9) is provided with an arm (14) having a member (15) for fixing the fuel tank (30), and the arm (14) is supported rotatably for the body fixing portion through an arm rotating shaft (13) and arranged to rotate about the shaft (13) as the center of rotation to the right or left side in a vertical plane. The arm (14) hangs down from the body side when it rotates.

6 Claims, 8 Drawing Sheets

FUEL TANK MOUNTING DEVICE AND AN INDUSTRIAL USE VEHICLE THEREWITH

BACKGROUND OF THE INVENTION

1. Field of the Invention

The present invention relates to a fuel tank mounting device with which an industrial use vehicle such as a forklift is provided, specifically to a fuel tank mounting device with which the look-behind easiness for the operator of the vehicle can be ensured when the fuel tank is fixed to the vehicle, the mounting/dismounting work as to the fuel tank can be performed in a simple manner with a one-step operation when the fuel tank is replaced with a newly charged fuel tank, and the tank replacement workability is extremely enhanced, and to an industrial use vehicle with the fuel tank mounting device.

2. Background of the Invention

There are some industrial use vehicles that are driven with fuel gas such as LPG (Liquefied Petroleum Gas). As an example of such vehicles, a forklift driven with fuel gas is shown in FIG. 8; whereby, the forklift 50 is provided with: the body frame 51 on which a seat 52 that the operator sits on is placed; a head guard 53 that is placed over the seat 52; a mast 54 that is placed on the front side of the body frame so as to be able to tilt; a fork 55 that is supported by the mast so as to freely ascend and descend along the longitudinal direction of the mast; a counterweight 56 that is provided on the rear side of the body frame so as to strike a balance between the front side weight and the rear side weight regarding the forklift body in response to a load lifting condition. In a conventional industrial use vehicle of this kind, a tank fixing mechanism (a tank mounting mechanism) 58 for fixing a fuel tank 57 charged with compressed fuel gas is usually provided so that the fuel tank 57 is fixed to the forklift over the counterweight 56 or on the head guard 53, on the rear side of the vehicle; thus, the fuel is supplied from the fuel tank 57 toward an engine room of the forklift, the engine room being placed at an area below the seat 52.

The conventional tank mounting mechanisms have a configuration whereby the upper face of the counterweight forms a substantially flat surface; the fuel tank is fixed to a bracket 58 placed on the upper face of the counterweight by use of at least one fixing band; and the axis direction of the fuel tank is placed along a direction perpendicular to the fore-and-aft direction of the vehicle. Further, when the fuel tank A is replaced by a newly charged fuel tank B, the bracket to which the fuel tank A has been fixed is made to slide into the rear side, so that the fuel tank can be removed from the vehicle namely from the bracket. Still further, in another conventional way, when the fuel tank A is replaced by the tank B, the bracket to which the fuel tank A has been fixed is made to slide toward the rear side, and a hinge rotation axis is formed by an edge of the bracket so that the bracket together with the fuel tank is rotated about the hinge rotation axis and the tank is lowered toward the ground whereby the tank can stand upright in order to be removed from the bracket.

The patent reference 1 (JP2003-118990) discloses a configuration whereby a concave shape (seen from the rear side as depicted FIGS. 1-3 of the reference) is formed in the counterweight so that the upper face of the counterweight is lowered, and the left and right end areas of the counterweight protrude upward; a tank fixing means for fixing the fuel tank placed between the left and right end protruding areas of the counterweight comprises a sliding mechanism by which the tank is made slide fore-and-aft and vice versa, and a lowering/lifting mechanism for lowering the fuel tank A from a laterally laid condition (an upper home position) to a vertically hung-down condition (a lower home position) and lifting the fuel tank B from the vertically hung-down condition to the laterally laid condition. The reference lays stress on the following points; according to the disclosure, due to the lowered upper face of the counterweight, the field of the operator's vision toward the back way in the rear can be prevented from being hindered by the fuel tank; and, due to the provided tank fixing means and the lowering/lifting mechanism, the replacement work as to the fuel tank can be easily performed.

As described thus far, the conventional fuel tanks are fixed to the vehicle over the counterweight or on the head guard, so as to be installed on the rear side of the vehicle; the fuel tanks are placed at a remarkably higher position beyond the upper face of the counterweight; thus, when the operator while sitting on the seat looks behind, the field of the operator's vision is hindered by the fuel tank. In this way, there has been a problem in ensuring the look-behind easiness. Especially in a case where the fuel tank is made slide backward and the tank fixing means for fixing the fuel tank is placed on the counterweight of the vehicle rear side so as to reduce the slide distance, the look-behind easiness is further spoiled.

According to the device disclosed by the patent reference 1, the look-behind easiness can be improved to some extent; however, since the tank replacement work includes the steps of making the tank slide backward, rotating the tank and the supporting bracket thereof about an horizontal axis, and placing the tank in an upright attitude, the replacement work is complicated. Further, since the device itself for performing this replacement work becomes complicated and the replacement work of heavy tanks has to be often performed, there is apprehension about problems.

In addition, for the conventional fuel tank dismounting device whereby the fuel tank is made slide toward the rear side direction when being dismounted for the replacement, the weight of the counterweight must be taken into consideration; namely, the counterweight needs to be weighty. In this regard, the length of the counterweight along the fore-and-aft direction of the vehicle has to be long enough to ensure the weight. Therefore, in the conventional fuel tank mounting/dismounting device, there has been a difficulty that the slide distance is lengthy, the tank replacement workability is spoiled, and the mounting/dismounting device itself becomes large.

Moreover, in the conventional fuel tank dismounting device whereby the fuel tank is hung down by a rotation mechanism in an upright attitude after being made slide toward the rear side direction, there has been a difficulty in dismounting/mounting the fuel tank in/from the upright attitude, since there is a large space between the bottom face of the fuel tank and the ground, when the tank with the bracket is placed in the upright attitude.

On the other hand, as is often the case with a conventional industrial use vehicle, the seat for the operator needs to be made slide forward or the back of the seat needs to be reclined when the cover of the engine for the vehicle has to be opened so that the maintenance work as to the engine is performed; nevertheless, the counterweight of the conventional vehicle hinders this engine maintenance work. In this way, the engine maintenance work has to accompany the movement as to a configuration element such as the seat thereby the position thereof needs to be shifted forward so as to fully open the engine cover. Thus, there has been a problem that the maintenance work requires much expense in time and effort.

SUMMARY OF THE INVENTION

In view of the above-described problems in the conventional technologies and anticipated solutions thereof, the present disclosure aims at providing a fuel tank mounting (and dismounting) device and an industrial use vehicle therewith, whereby the look-behind easiness of the operator can be enhanced; the fuel tank replacement work can be performed with one touch operation; the fuel tank can be hung-down to a lower (hung-down) home position near to the ground; and the satisfactory workability as to the tank replacement operation can be achieved.

In order to achieve the above objectives, a first mode according to the present invention is a fuel tank mounting device of an industrial use vehicle for mounting a fuel tank over the top face of the vehicle, wherein the fuel tank mounting device is provided with an arm comprising at least two fixing members for fixing the fuel tank on the arm so as to place the fuel tank over the top face of the vehicle at front or rear side of an operator seat, which is for the operator of the vehicle to sit on, of the vehicle, whereby the arm is supported by a stationary part of the vehicle so as to rotate around an arm rotation axis that lies at right angles to the surface of the stationary part of the vehicle;

the arm is configured so as to rotate around the arm rotation axis in a vertical plane that is vertical to the longitudinal axis of the vehicle, toward either of the left and right sides of the vehicle as to the vehicle traveling direction; and, the arm is able to hung down toward the left or right side of the vehicle as to the vehicle traveling direction by the rotation movement of the arm.

In compliance with the above first mode of the present invention, in a case of the fuel tank replacement work, the movement operation as to the fuel tank can be performed with one touch operation; the fuel tank can be hung-down to a lower (hung-down) home position near to the ground; and the satisfactory workability as to the tank replacement operation can be achieved.

A second mode according to the present invention is a fuel tank mounting device of an industrial use vehicle for mounting a fuel tank over the top face of a counterweight provided at the rear side of the vehicle, wherein the fuel tank mounting device is provided with an arm comprising at least two fixing members for fixing the fuel tank on the arm so as to place the fuel tank over the top face of the counterweight, at the front side of the counterweight, whereby the arm is supported by a stationary part of the vehicle so as to rotate around an arm rotation axis that lies at right angles to the surface of the stationary part of the vehicle;

the arm is configured so as to rotate around the arm rotation axis in a vertical plane that is vertical to the longitudinal axis of the vehicle, toward either of the left and right sides of the vehicle as to the vehicle traveling direction; and, the arm is able to hung down toward the left or right side of the vehicle as to the vehicle traveling direction by the rotation movement of the arm.

In the next place, a third mode (a preferable mode) based on the above second mode according to the present invention is the fuel tank mounting device, whereby a concave along the vehicle width direction is formed on the top face of the counterweight, at the front side of the counterweight, so that the space of the concave houses the fuel tank, and the arm is placed at the location corresponding to the concave.

In compliance with the second and third modes according to the present invention, the operator's look-behind easiness can be enhanced; the movement operation as to the fuel tank can be performed with one touch operation; the fuel tank can be hung-down to a lower (hung-down) home position near to the ground; and the satisfactory workability as to the tank replacement operation can be achieved.

In this way, the concave is formed on the counterweight and the fuel tank is housed therein; thus, the height level of the fuel tank mounted on the vehicle is lowered in comparison with the former height level, and the look-behind easiness can be enhanced. By a manner that the cut-off volume regarding the concave is distributed on the rear face of the counterweight so that the look-behind easiness is not spoiled, the functionality of the counterweight can be maintained; the sense of unity can be developed between the fuel tank and the vehicle; thus, the design as to the whole vehicle can become more sophisticated.

Moreover, according to the above invention, the fuel tank can be placed over the counterweight at the front side of the counterweight; thus, the look-behind easiness can be further enhanced. In addition, in the conventional manner, the fuel tank is dismounted toward the rear side of the vehicle after being made slide toward the rear side; on the contrary, according to the above preferable mode of this invention, even when the fuel tank is placed at the front side of the counterweight, the fuel tank is not made slide toward the rear side of the vehicle, nor is dismounted toward the rear side; the fuel tank in this invention is hung down toward the left or right side of the vehicle. Thus, even though the longitudinal length of the vehicle or the counterweight is prolonged, the workability as to the tank replacement operation can remain unchanged; further, the tank mounting/dismounting device can remain compact.

Further, since the fuel tank is hung down toward the left or right side of the vehicle, the height of the lowermost position of the fuel tank while being hung down, from the ground can be minimal; namely, the fuel tank can be hung down closer to the ground. Thus, the tank replacement workability can be enhanced. In addition, since the fuel tank is mounted on the vehicle at the front side of the counter weight, the distance from the fuel tank to the engine room can be reduced; thus, the corresponding piping length can be reduced so as to simplify the piping system.

Further, regarding the opening operation as to the engine cover, according to a conventional way, the cover opening manner has generally required such operations as the sliding of the seat and the reclining of the seat back; on the other hand, regarding the opening operation as to the engine cover, according to the present invention, the engine cover can be fully opened without moving the seat position, since the cover opening operation can be performed under a condition that the fuel tank is hung down or removed. In this way, the workability as to the maintenance can be enhanced.

In the next place, a fourth mode according to any one of the above-described modes is the fuel tank mounting device, whereby the arm forms a square U-shape;

the fixing members are provided on a side of the U-shaped arm, the side corresponding to the left or right side of the square U-shape;

the fuel tank is placed on and along the side of the arm on which the fixing members are provided, when the arm is in the upper position that corresponds to the home position of fuel tank mounted on the vehicle;

the opening side of the square U-shaped arm that corresponds to the upper opening part of the square U-shape is directed to the direction toward which the arm is hung down, when the arm is in the upper position that corresponds to the home position of fuel tank mounted on the vehicle; and, the arm rotation center of the arm is placed near to the upper left or right side of the square U-shaped arm in response to the tank dismounting side, and the arm is supported pivotally around the rotation center.

Thus, by forming the arm in a square U-shape, the arrangement as to the exhaust gas passage with which the vehicle is provided can be ensured. In addition, when the fuel tank is hung down toward the left or right side of the vehicle, the height level of the fuel tank can be reduced to a minimal level; thus, the tank replacement operation can be made easier. Further, in a case of providing the concave on the top face of the counterweight, the cut-off volume for the concave or for the modification of the counterweight geometry can be a minimal volume; thus, it is advantageous to provide the concave on the counterweight.

In the next place, a fifth mode according to any one of the above-described modes is the fuel tank mounting device, wherein the arm forms a L-shape;

the fixing members are provided on a side of the L-shaped arm;

the fuel tank is placed on and along the side of the arm on which the fixing members are provided, when the arm is in the upper position that corresponds to the home position of fuel tank mounted on the vehicle;

the bend (corner part) of the L-shape arm is placed at the upper location of the opposite side of the tank dismounting side, namely the arm hung-down side;

the lower end of the L-shaped arm that is placed in the upper position is pivotally supported around the arm rotation axis.

In this way, by forming the arm in a L-shape, the configuration of the arm can be simplified; at the same time, the arrangement as to the exhaust gas passage with which the vehicle is provided can be ensured.

In the next place, a sixth mode according to any one of the above-described modes is the fuel tank mounting device, the device further provided with:

an upper locking device by which the rotation movement of the arm with or without the fuel tank is stopped at rest, and the arm is fixed to a stationary part of the vehicle, at the lifted-up home position; and a lower locking device by which the rotation movement of the arm with or without the fuel tank is stopped at rest, and the arm is fixed to a stationary part of the vehicle, at the hung-down home position.

In this way, by providing the upper locking device and the lower locking device, the over-rotation of the arm beyond the upper home position or the lower home position can be evaded; and the rotation of the arm can be stopped (be at rest) at the home positions so as to fix the position of the fuel tank; a stable placement as to the fuel tank in a case of mounting can be ensured; further, a stable and safe replacement work as to the tank can be ensured so that the workability can be enhanced.

In the next place, a seventh mode according to any one of the above-described modes is the fuel tank mounting device, the device further comprising an elastic member that assists the upward movement of the fuel tank or the rotation movement as to the arm together with the tank, whereby the elastic force of the elastic member is set-up so as to be biased in response to the extension or the contraction of the elastic member; and, the elastic member is biased so that the elastic member assists the movement of the arm from the hung-down home position to the lifted-up home position In this way, by annexing the elastic member to the fuel tank mounting device, even the fuel tank of a heavy weight due to the charged gas in the tank can be mounted on the vehicle without enormous lifting force.

In the next place, a eighth mode as per any one of the above-described modes is an industrial use vehicle that is provided with the fuel tank mounting device mentioned above.

In this way, an industrial use vehicle can be provided whereby the operator's look-behind easiness can be enhanced; the movement operation as to the fuel tank can be performed with one touch operation; the satisfactory workability as to the tank replacement operation can be achieved; and, the functionality of the vehicle as to maintenance is enhanced.

As described thus far, according to the present invention, the operator's look-behind easiness can be enhanced; the mounting and dismounting operation as to the fuel tank can be performed with one touch operation; the fuel tank can be hung-down to a lower (hung-down) home position near to the ground; and the satisfactory workability as to the tank replacement operation can be achieved.

Moreover, the concave provided on the top face of the counterweight houses the fuel tank; thus, the operator's look-behind easiness can be enhanced; in addition, the functionality of the counterweight is maintained. Further, the sense of unity can be developed between the fuel tank and the vehicle; thus, the design as to the whole vehicle can become more sophisticated.

Moreover, according to the above invention, the fuel tank can be placed over the counterweight at the front side of the counterweight; thus, the look-behind easiness can be further enhanced. In addition, in the conventional manner, the fuel tank is dismounted toward the rear side of the vehicle after being made slide toward the rear side; on the contrary, even when the fuel tank is placed at the front side of the counterweight, the fuel tank is not made slide toward the rear side of the vehicle, nor is dismounted toward the rear side; the fuel tank in this invention is hung down toward the left or right side of the vehicle. Thus, even though the longitudinal length of the vehicle or the counterweight is prolonged, the workability as to the tank replacement operation can remain unchanged; further, the tank mounting/dismounting device can remain compact.

Thus, by forming the arm in a square U-shape or a L-shape, the arrangement as to the exhaust gas passage with which the vehicle is provided can be ensured.

In this way, by providing the upper locking device and the lower locking device, the over-rotation of the arm beyond the upper home position or the lower home position can be evaded; and the rotation of the arm can be stopped (at rest) at the home positions so as to fix the position of the fuel tank; a stable placement as to the fuel tank in a case of mounting can be ensured; further, a stable and safe replacement work as to the tank can be ensured so that the workability can be enhanced.

Thus, by annexing the elastic member to the fuel tank mounting device, even the fuel tank of a heavy weight due to the charged gas in the tank can be mounted on the vehicle without enormous lifting force.

DETAILED DESCRIPTION OF THE INVENTION

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

Figure 1:
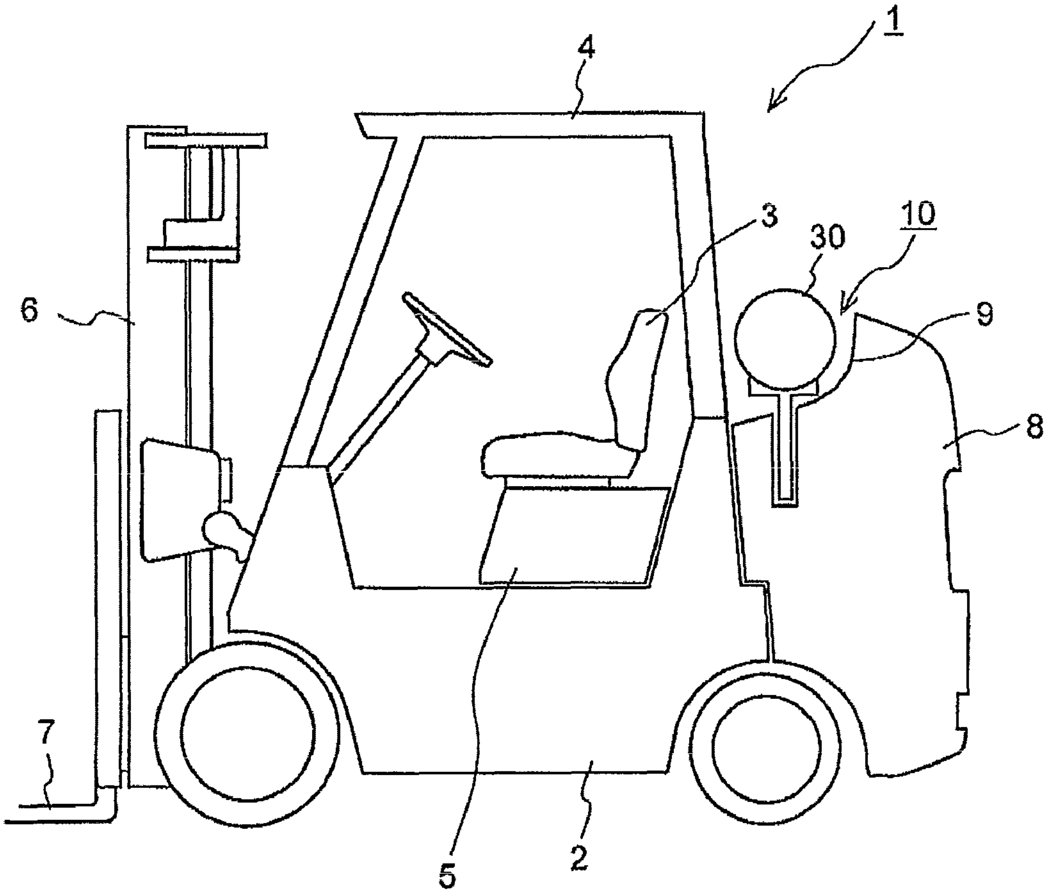
FIG. 1 shows a side view of a forklift that comprises a fuel tank mounting device according to an embodiment of the present invention.
Figure 6:
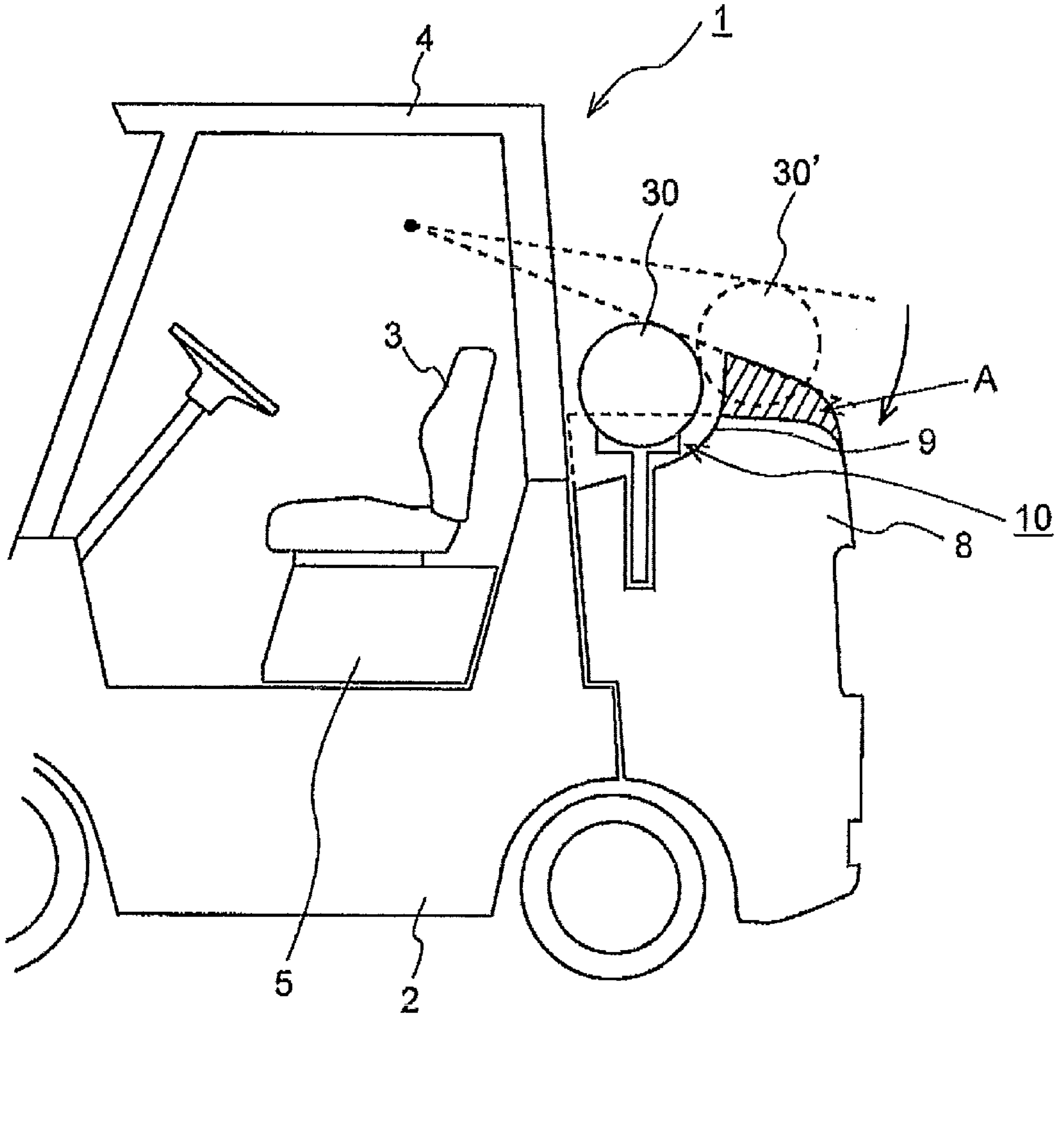
FIG. 6 explains the look-behind easiness as to the forklift.
Figure 7A:
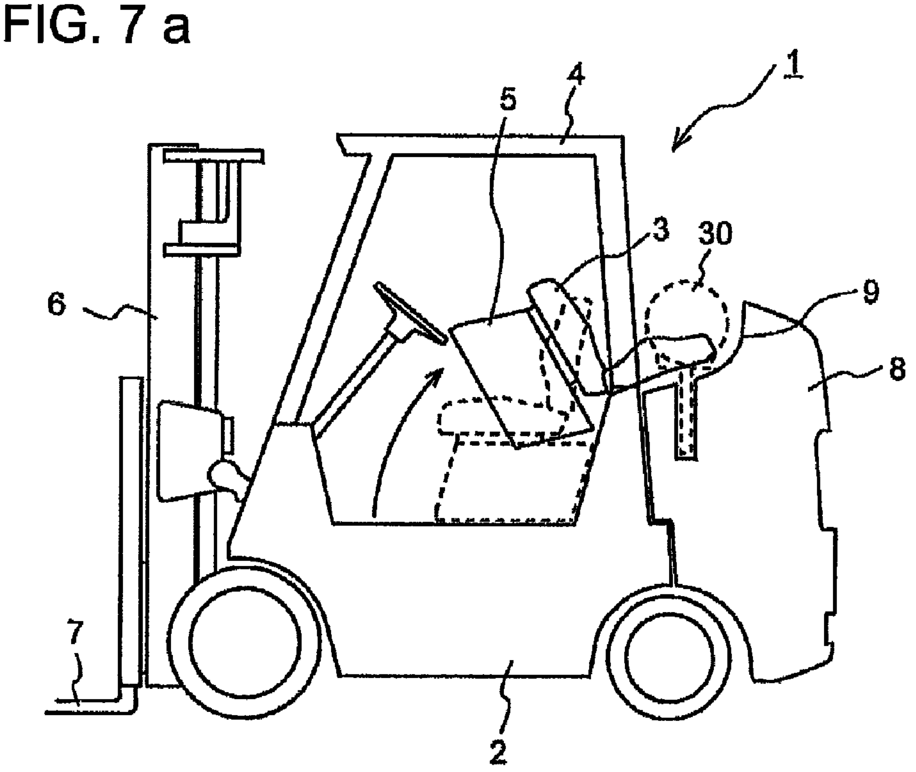
FIG. 7*a* explains the opening operation as to the engine cover, according to the embodiment of the present invention.
Figure 7B:
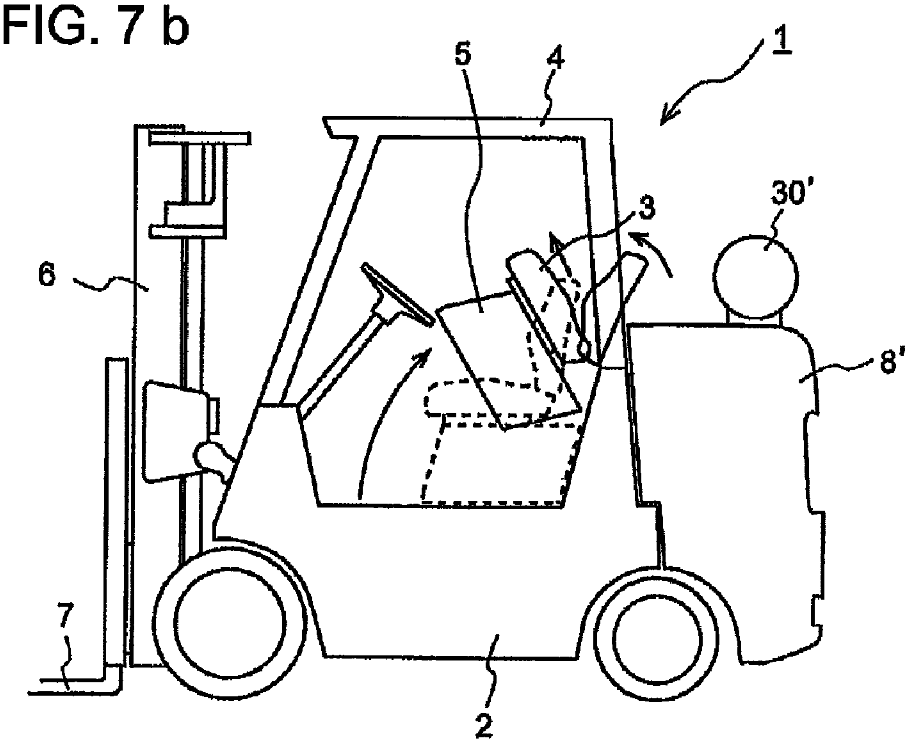
FIG. 7*b* explains the opening operation as to the engine cover, according to a conventional manner.
Figure 8:
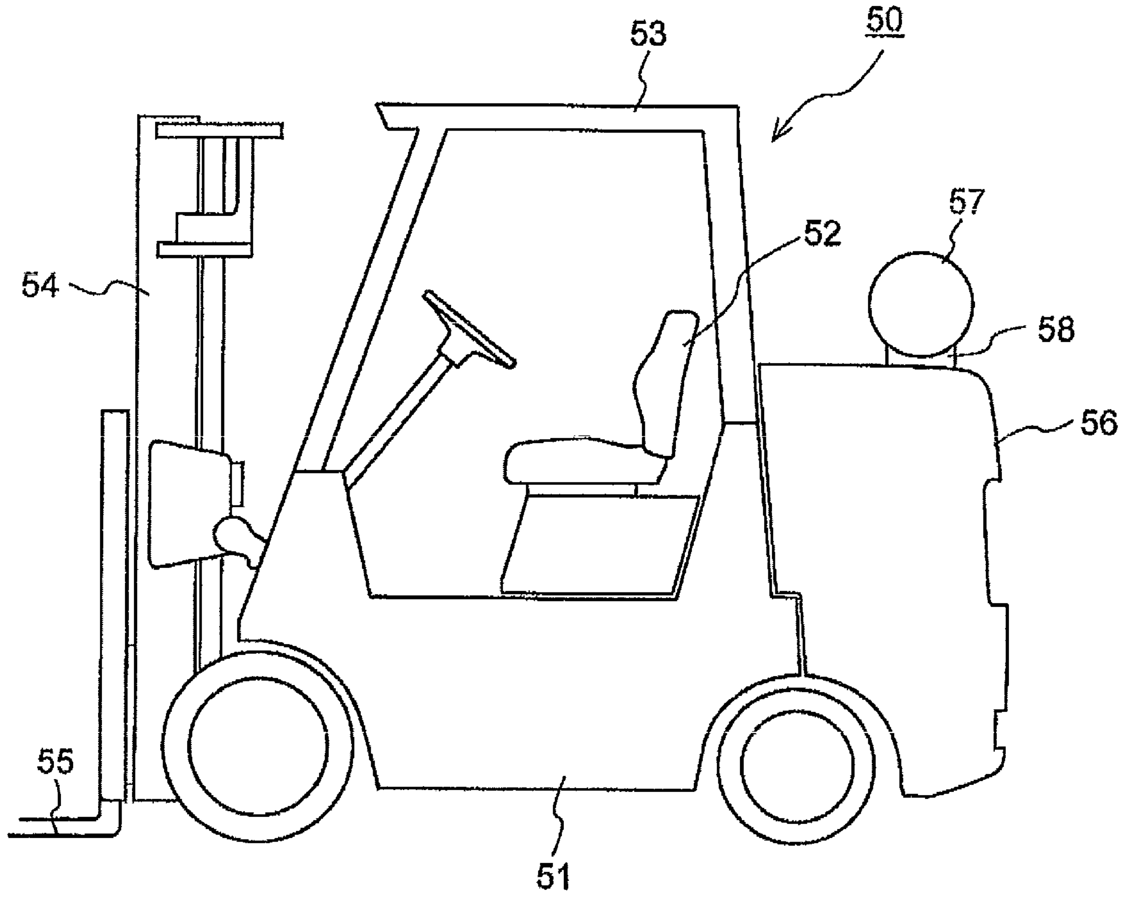
FIG. 8 shows a side view of a forklift that is provided with a fuel tank, according to a conventional manner.

FIG. 1 shows a side view of a forklift that comprises a fuel tank mounting device according to an embodiment of the present invention; FIGS. 2-5 show various kind of views as to the fuel tank mounting device according to the embodiment of the present invention; FIG. 6 explains the look-behind easiness as to the forklift; FIG. 7*a* explains the opening operation as to the engine cover, according to the embodiment of the present invention; FIG. 7*b* explains the opening operation as to the engine cover, according to a conventional manner. In the embodiment according to the present invention, an explanation with an example of a forklift that is provided with a counterweight on the rear side of the forklift is now given, the fuel tank being mounted on the counterweight; as a matter of course, the present invention is not limited within the scope of this example; and the invention is applicable to the whole industrial use vehicles that are to be provided with a fuel tank mounting device for mounting/dismounting a fuel tank charged with fuel for driving the vehicle, over the top face of the vehicle at the front side as well as on the rear side of the seat for the operator. Further, where the kinds of the industrial use vehicles are concerned, the present invention is preferably applicable to the vehicles that are provided with the engines driven with LP gas, or the vehicles that are driven by a gasoline engine or a diesel engine.

In consultation with FIG. 1, the configuration of the forklift according to the embodiment of the present invention is now explained.

A forklift 1 comprises: a body frame 2 provided with a seat 3 on which the operator sits; a head guard 4 that is placed over the seat 3; an engine cover 5 that is provided below the seat 3; a mast 6 tiltably placed on the front side of the body frame 2; a fork 7 supported by the mast 6 so as to freely ascend and descend along the longitudinal direction of the mast; a counterweight 8 that is provided on the rear side of the body frame 2 so as to strike a balance between the front side weight and the rear side weight regarding the forklift body in response to a load lifting condition. Typically in the embodiment, the forklift further comprises a fuel tank mounting device for mounting (and dismounting) a fuel tank 30 for storing fuel to drive the engine of the forklift. For example, the fuel tank 30 is a tank charged with compressed fuel gas such as LP gas, or a tank filled with liquid fuel such as gasoline, diesel fuel oil, or heavy fuel oil.

The fuel tank mounting device comprises a concave 9 that is a depressed part formed at the front side top face of the counterweight 8, and a bracket 10 fitted to the concave 9 and fixed to either the body frame 2 or the head guard 4 to support the fuel tank 30.

The concave 9 has a shape that the vehicle body (the head guard) side top face of the counterweight 8 is cut off in a J-shaped curve (FIGS. 2, 6, and 7*a*) so as to be depressed. The depressed concave is formed so that the fuel tank 30 can be laterally placed along the vehicle width direction in the concave in accordance with the size and the shape of the fuel tank 30. As described thus far, in the present embodiment, the J-shaped concave curve surface is formed, but the concave curve surface may be formed by a plurality of plane segments; namely, the concave surface may be formed like a part of a longitudinal surface of a prism (a polygon prism) the top/bottom of which forms a polygon. The depth of the concave 9 is determined so that the fuel tank 30 does not protrude upward remarkably over the uppermost face of the counterweight 8. Further, in response to the volume corresponding to the space cut off by the concave, the equivalent volume is added to the counterweight on the rear side of the fuel tank.

In addition, the fuel tank mounting device is preferably placed at a location where a configuration member such as the counterweight 8 or the head guard 4 protects the fuel tank 30 from coming in contact with the substances around the vehicle while running or turning; namely, the fuel tank is placed so that the tank stays inside of the outer contour surface of the (original) counterweight 8, and the left and right ends (namely, the top and bottom ends) of the tank do not protrude outside of the vehicle along the vehicle width direction.

Next, in consultation with FIGS. 2-5, the configuration of the bracket 10 that holds the fuel tank 30 is explained.

Figure 2:
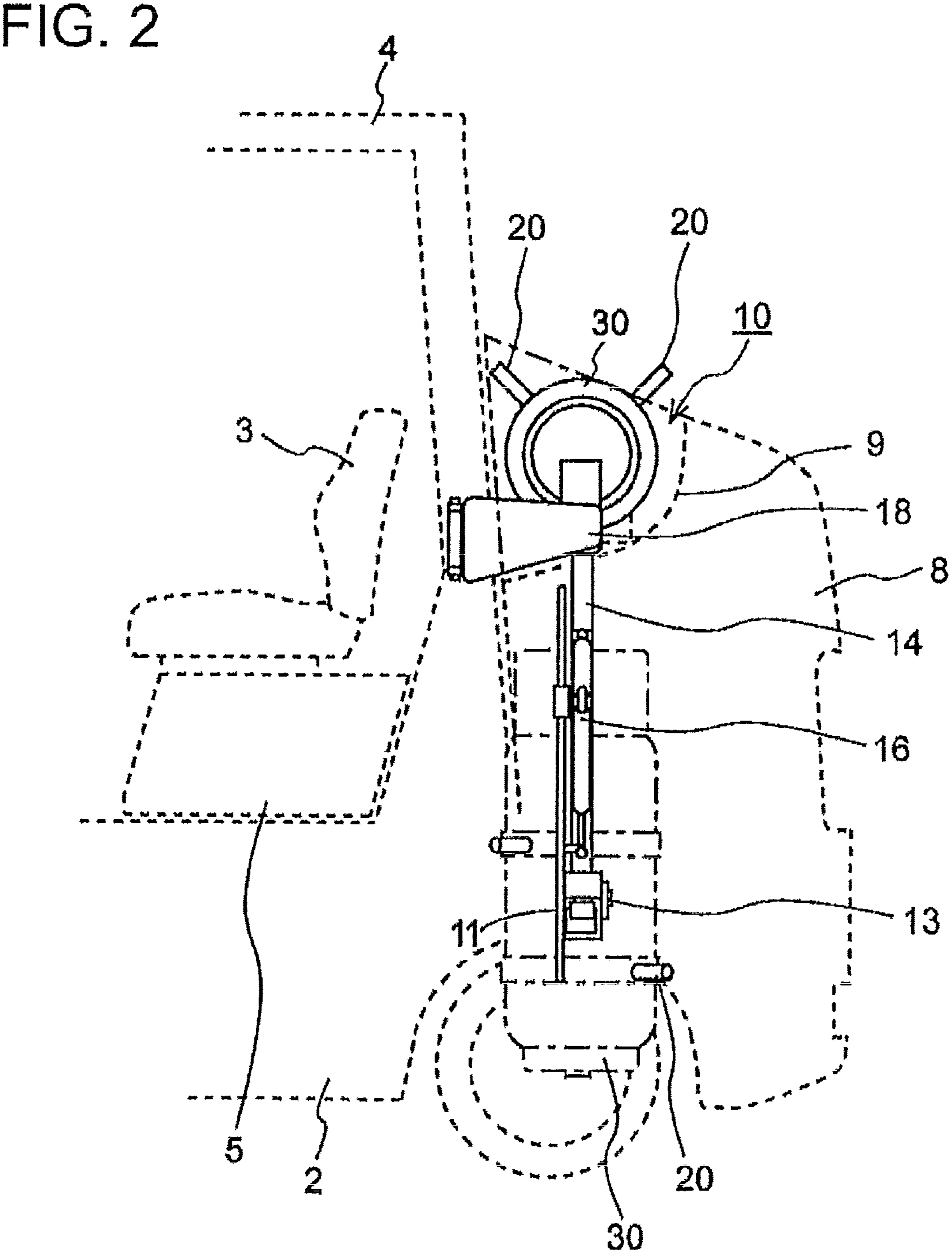
FIG. 2 shows a side view as to a fitting arrangement of the fuel tank mounting device according to the embodiment of the present invention.
Figure 3:
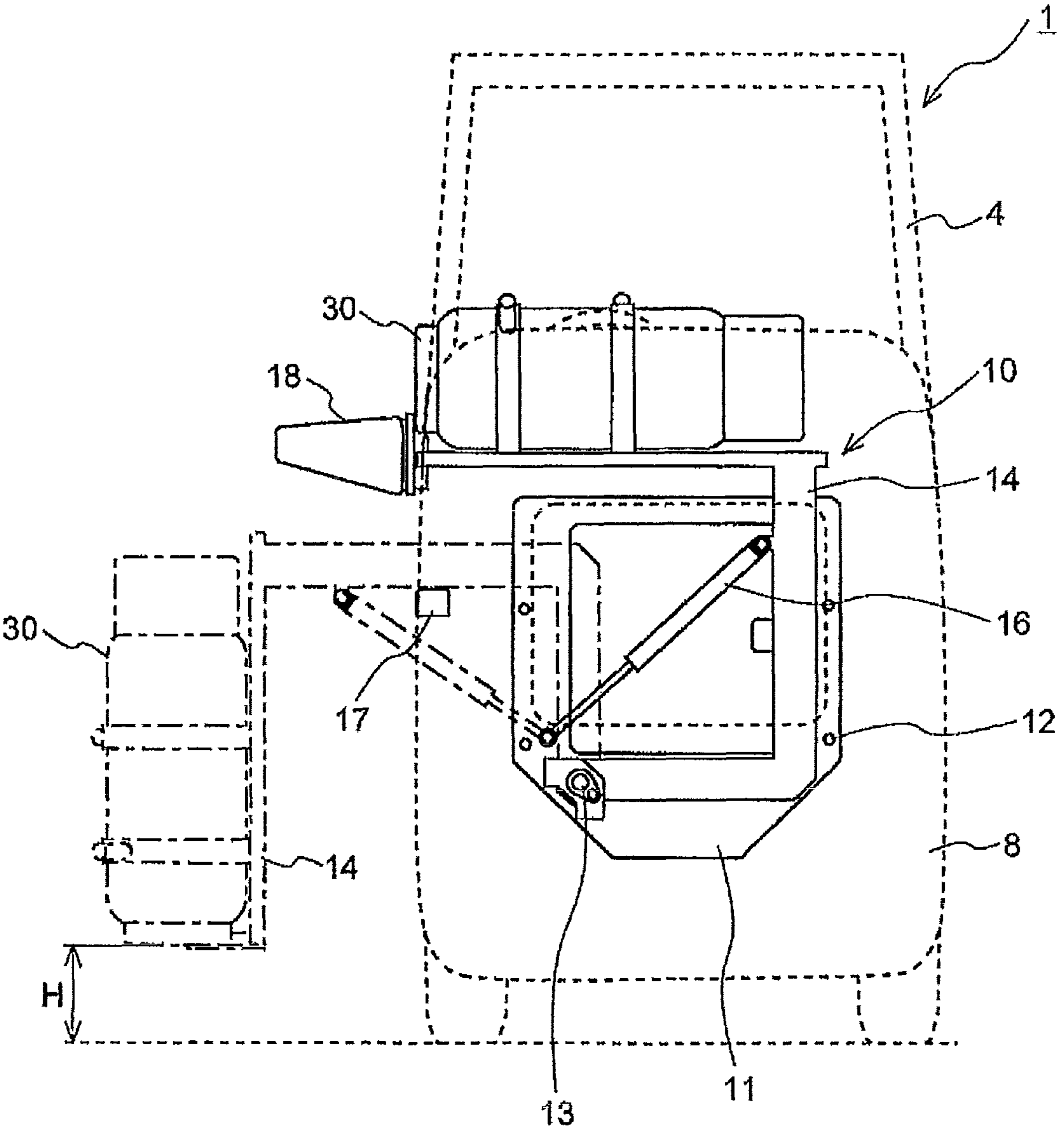
FIG. 3 shows an elevation view as to the fitting arrangement of the fuel tank mounting device according to the embodiment of the present invention.

As shown in FIGS. 2 and 3, the bracket 10 comprises: a base plate 11 that is fixed to the body frame 2 or the head guard 4; an arm 14 that is supported by an arm rotation axis 13 so that the arm is able to rotate freely around the axis 13; at least one fixing belt 15 (FIG. 4) that fastens the fuel tank 30 to the arm 14; a gas spring (an elastic member) 16 that is stretched between the base plate 11 and the arm 14; a first locking device (a lower locking device) 17 that is fitted to either the body frame 2 or the counterweight 8 as stationary members of the vehicle, and used for locking the arm while the tank is being mounted on the counterweight; a second locking device (an upper locking device) 18 that is fitted to either the body frame 2 or the counterweight 8 as stationary members of the vehicle, and used for locking the arm while the tank is being dismounted near to the ground; at least one grip (gripper) 20.

Figure 4:
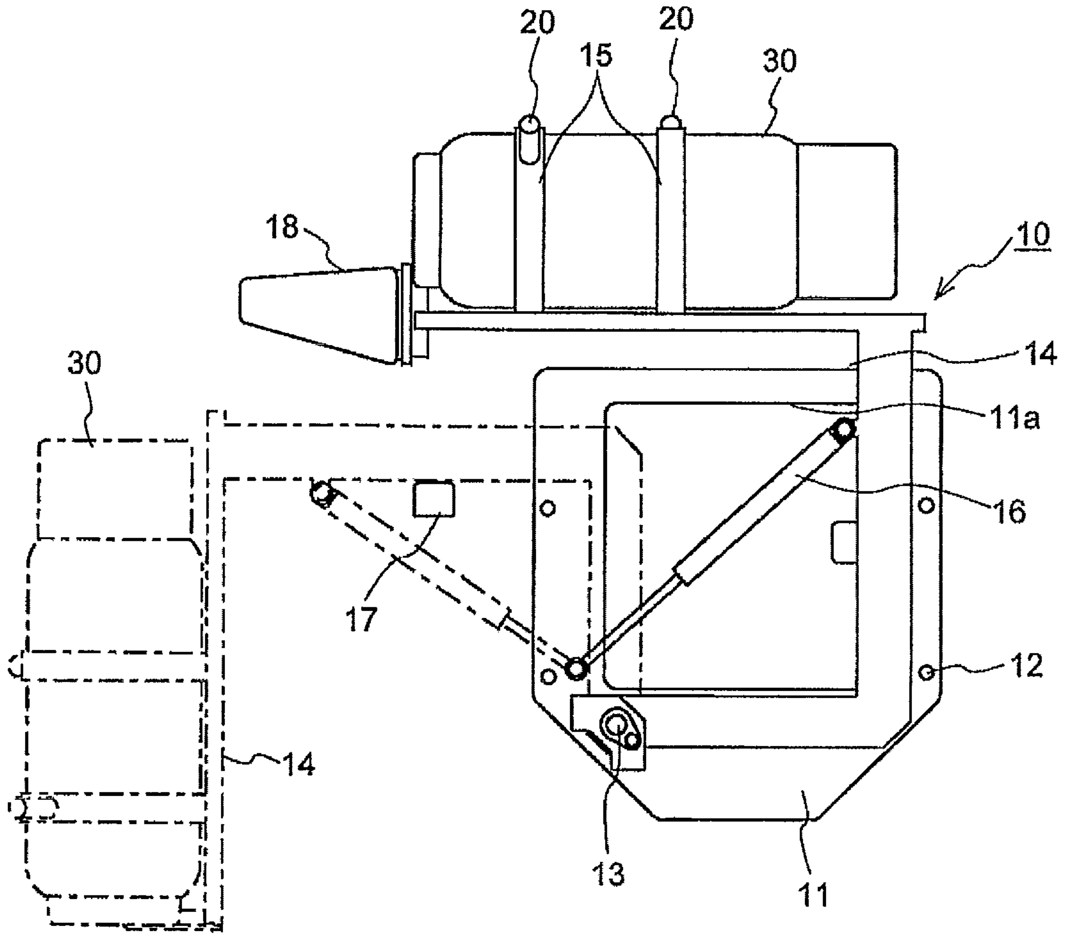
FIG. 4 shows the elevation view of the fuel tank mounting device according to the embodiment of the present invention.
Figure 5:
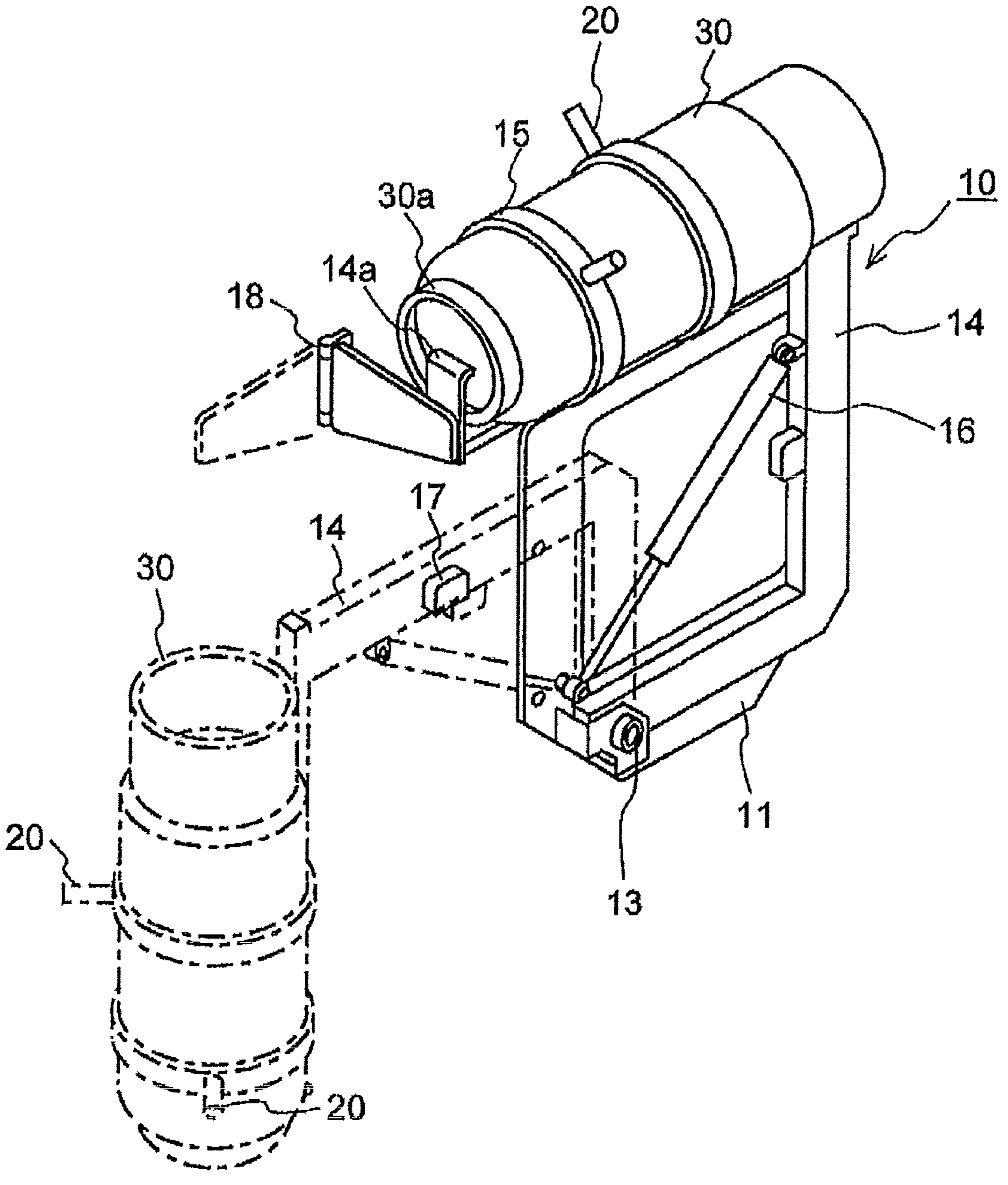
FIG. 5 shows an oblique perspective figure of the fuel tank mounting device according to the embodiment of the present invention.

FIGS. 4 and 5 show a detailed configuration of the fuel tank mounting device. The base plate 11 is a member for fixing the bracket 10 including the arm 14 to the vehicle; and, the base plate 11 fastened to one of the body frame 2 or the head guard 4 or the counterweight 8 that are the stationary members of the vehicle, by means of a plurality of bolts, thereby the bolts are screwed into one of the stationary members through a plurality of bolt holes 12. The base plate 11 forms a plate shape that has a rectangular exhaust gas opening 11*a* in the middle area of the base plate. The exhaust gas opening 11*a* is provided so that the base plate dose not hinder the exhaust gas passage from a radiator of the engine, the passage which is placed between the body frame 2 and the counterweight 8.

The arm 14 forms a square U-shape (of which the left and right sides are not symmetric) in accordance with the shape of the rectangular exhaust gas opening 11*a*, and is supported so that the arm can rotate freely (pivotally) around the arm rotation axis 13. In a case where the fuel tank 30 is hung down toward the left side of the vehicle (namely, the left side as to the traveling direction of the vehicle), the arm 14 is arranged so that the upper opening (an imaginary side-line) of the square U shape as to the arm shape placed vertically on the left side, and the arm rotation axis 13 is placed at the lower left side of the base plate 11, a lower end point of the arm 14 being supported pivotally around the axis 13.

On the other hand, in a case where the fuel tank 30 is dismounted toward the right side of the vehicle (namely, the right side as to the traveling direction of the vehicle), the arm 14 is arranged in a left-right symmetry pattern of the above case (of the left dismounting case) so that the arm rotation axis 13 is placed at the lower right side of the base plate 11, a lower end point of the arm 14 being supported pivotally around the axis 13.

The arm 14 may be formed to be a L-shape instead (the explanation figure is not shown); and, in a case where the fuel tank 30 is mounted on the vehicle and the arm of the L-shape is placed on the upper fixed location, a side of the arm (a L-shape's side) on which the fixing belt is provided is placed along the mounting face of the fuel tank 30; the bend (the corner part) of the L-shaped arm 14 is placed upper side of the left or right side opposite to the tank dismounting right or left side, a lower end point of the arm 14 being supported pivotally around the axis 13 as is the case with the U-shaped arm.

It is hereby noted that the shape and arrangement as to the arm 14, the base plate 11 and the arm rotation axis 13, in this embodiment, are of a typical example; and the scope of the shape and arrangement is not limited by the above description. The shape and arrangement as to the arm 14, the base plate 11 and the arm rotation axis 13 may simply form a configuration whereby the arm 14 is able to be rotated down toward the left or right side ground of the vehicle, so that the mounting/dismounting work as to the fuel tank can be performed in a simple manner with a one-step operation, when the fuel tank is replaced with a newly charged fuel tank, and the exhaust gas passage from the radiator of the engine the passage which is placed between the body frame 2 and the counterweight 8 can be free from being hindered.

Thus, the arm 14 and the arm rotation axis may be configured so that the fuel tank mounting/dismounting device is rotated down (hung down) toward the left or right side ground of the vehicle; however, the rotation toward the left side ground (namely, the rotation toward the left side as to the traveling direction of the vehicle as is the case of FIG. 3) is rather preferable. The reason is that the operator on the vehicle is generally prone to turn around while turning his or her body clockwise seen from the top, from a workability point of view; thereby, if the fuel tank 30 is dismounted to the left side as to the traveling direction of the vehicle, then the operator's right back view can be widely ensured, as the fuel tank 30 and the bracket 10 are on the left side and do not block the operator's view. In addition, the operator practically (as a rule) gets on the vehicle from the left side and gets off the vehicle to the left side; thus the dismounting toward the left is preferable Moreover, the arm 14 is provided with the gas spring (an air cylinder) 16 that assists the upward movement of the fuel tank or the rotation movement of the arm together with the tank. An arrangement example as to the gas spring (the air cylinder) 16 is depicted in FIG. 4. An end of the gas spring 16 is pivotally connected to a point of the base plate 11 in the neighborhood of the arm rotation axis 13. In a similar way, another end of the gas spring 16 is connected to a point on a side of the arm 14. It is preferable that the point on a side of the arm 14 is on the middle side of the square U-shaped arm 14, namely, on the bottom side of the square U-shape. Further, the connection point is preferably located being apart from the arm rotation center, toward a remote point on the middle side from the midpoint thereon. The spring force of the gas spring is set-up so as to be biased in response to the extension or the contraction of the spring; in this application, the gas spring is biased so that the spring force assists the movement of the arm 14 from the hung-down position (as shown with the long and short dash line in FIG. 4) to the lifted-up position (as shown with the solid line in FIG. 4).

Further, as shown in FIG. 5, the bracket 10 is provided with the upper locking device (a locking device for the fuel tank under an unloaded condition) 18 and the lower locking device 17 so that the arm is fixed in place respectively according to the lifted-up position and the hung-down position.

The upper locking device (a locking device for the fuel tank under an unloaded condition) 18 is provided with a locking mechanism whereby the arm 14 mounted with the fuel tank 30 is at rest and is fixed to the lifted-up position when the arm 14 is lifted-up. The arm is preferably provided with a mechanism by which the bottom side of the fuel tank that is securely mounted on the arm is supported by the head guard 4, the body frame 2, or the counterweight 8, when the arm 14 is fixed to the lifted-up position at rest. Thus, the fuel tank 30 is supported from a side of the arm as well as from a side of the upper locking device; as a result, the locking stableness as to the fuel tank is enhanced.

On the other hand, the lower locking device 17 is provided with a locking mechanism whereby the arm 14 is at rest and fixed to the hung-down position (the position of the fuel tank 30 when being hung down), when the arm 14 mounted with the fuel tank 30 is hung down toward the ground.

Preferably, the lower locking device 17 is placed on the middle side (the bottom side of the U-shape) of the arm 14 as well as at a corresponding position on the head guard 4, the body frame 2 or the counterweight 8 where the middle side with the device 17 to be when the arm 14 is brought in the hung down position, whereby the arm 14 is fixed by the lower locking device 17 when the arm is in the hung down position. Accordingly, it is prevented that the arm 14 rotates beyond the hung-down position; it is also prevented that the biased force of the gas spring 16 draws the arm 14 back toward the lifted-up position.

Further, in this embodiment, the fixing belts 15 are provided with more than one grip 20; the grip 20 is preferably provided at two positions. Further preferably, one grip 20 (a first grip 20) is fitted to the fixing belt 15 that is positioned at the upper side of the hung-down fuel tank 30 and another grip 20 (a second grip 20) is fitted to the other fixing belt 15 that is positioned at the lower side of the hung-down fuel tank 30. Moreover, when the hung-down fuel tank 30 fastened to the arm by the fixing belts 15 is seen from the left or right side of the vehicle, the locations as to the first and second grip are out of synch in left or right direction as to the viewer. In this way, either one of the grips 20 can be grasped while the tank fastened to the arm is being mounted on or dismounted from the vehicle. Further, only one of the grips may be grasped by one of the operator's hand when the arm is fixed to be at rest by use of the upper locking device 18 or the lower locking device 17. Thus, the workability can be enhanced.

In this embodiment as shown in FIG. 5, one end of the arm 14 which supports the bottom face 20*a* of the fuel tank 30 is preferably provided with a bend 14*a* that is bent toward the bottom face 30*a*. With this composition, as the bend 14*a* can catch the bottom part of the fuel tank 30, the replacement work as to the fuel tank 30 can be easily performed, and the fuel tank can be stably fixed to the arm 14.

According to the configuration of this embodiment as described thus far, the look-behind easiness of the operator is enhanced; the replacement work as to the fuel tank 30 can be performed with one touch operation so that the fuel tank 30 can be hung-down near to the ground; hence, the workability as to the tank replacement operation can be enhanced.

In other words, when the operator sitting on the seat 3 looks back, the operator's view is not hindered by the fuel tank 30; in short, the look behind easiness can be enhanced. On the other hand, according to the conventional configuration as to the fuel tank mounting/dismounting device as shown in FIG. 6, the fuel tank 30' is placed over the flat top face of the counterweight 8; consequently, the location level of the fuel tank 30' is so high that the tank hinders the field view from the operator's view point 40 in looking back; namely, the looking-back easiness has been spoiled. On the contrary, according to this embodiment of the present invention, as shown by the configuration with the solid lines in FIG. 6, the concave 9 is formed at the counterweight 8 and the fuel tank 30 is housed and buried in the concave 9; accordingly, the height level of the fuel tank 30 is lowered in comparison with the conventional height level, and the look-behind easiness can be enhanced; thereby, the performance of the counterweight, namely, the weight balance of the vehicle can be maintained by a manner that the cut-off weight corresponding to the volume A of the concave 9 is distributed on the rear face of the counterweight 8; further, the sense of unity can be developed between the fuel tank 30 and the vehicle; thus, the design as to the whole vehicle can become more sophisticated.

Moreover, according to this embodiment, the fuel tank 30 can be placed at the front side of the counterweight 8; thus, the look-behind easiness can be further enhanced. In addition, in the conventional manner, the fuel tank 30 is dismounted toward the rear side of the vehicle after being made slide toward the rear side; on the contrary, in this embodiment, the fuel tank 30 is not made slide toward the rear side of the vehicle, nor is dismounted toward the rear side; the fuel tank in this embodiment is hung down toward the left or right side of the vehicle. Thus, even if the longitudinal length of the vehicle or the counterweight 8 is prolonged, the workability with the vehicle can remain unchanged; in addition, the tank mounting/dismounting device can remain compact.

Further, in this embodiment, since the fuel tank 30 is hung down toward the left or right side of the vehicle, the height H (FIG. 3) of the lowermost position of the fuel tank 30 while being hung down, from the ground can be minimal; namely, the fuel tank 30 can be hung down closer to the ground. Thus, the tank replacement workability can be enhanced. In addition, since the fuel tank 30 is mounted on the vehicle at the front side of the counter weight 8, the distance from the fuel tank to the engine room can be reduced; whereby the corresponding piping length can be reduced so as to simplify the piping system.

Further, as FIG. 7*b* explains the opening operation as to the engine cover according to a conventional manner, the cover opening manner has required such operations as the sliding of the seat 3 and the reclining of the seat back. On the other hand, as FIG. 7*a* explains the opening operation as to the engine cover according to the embodiment of the present invention, the engine cover 5 can be fully opened without moving the seat position, since the cover opening operation can be performed under a condition that the fuel tank 30 is hung down or removed. In this way, the workability as to the maintenance can be enhanced.

Still further, since the arm in this embodiment is provided with the gas spring 16, the fuel tank 30 can be easily lifted up, even if the fuel tank 30 is heavy because of the LP gas charged inside the tank. In addition, by the manner where the more than two grips 20 are fitted to the arm 14 or the fixing belt 15, the operation as to the tank mounting/dismounting can be made easier, and in locking the position of the fuel tank 30, a redundant operation step for changing the grip grasping can be dispensed with, for example, the shift from the right hand grasping to the left hand grasping for the locking device operation by the right hand can be omitted.

INDUSTRIAL APPLICABILITY

The fuel tank mounting mechanism and the vehicle therewith are hereby disclosed, whereby the look-behind easiness for the operator can be enhanced; the fuel tank mounting/dismounting operation can be performed with one touch operation so as to enhance the tank replacement workability. Thus, the disclosure can be applicable to all the industrial use vehicles such as a forklift, in the case where the fuel tank is to be mounted over the top face of the vehicle while the vehicles are traveling.

The invention claimed is:

1. A fuel tank mounting device of a vehicle for mounting a fuel tank, comprising:

an arm rotatably supported on a stationary part of the vehicle, the arm being rotatable between a first position at which the tank is placed over a top face of the vehicle or over a counterweight, provided at a rear of the vehicle, at a front or rear of a seat on which an operator sits, and a second position at which the tank is placed at a right side or a left side of the vehicle with respect to a traveling direction of the vehicle, wherein the arm forms a U-shape including a first arm provided with a tank fixing member, a second arm fixedly extending from the first arm, and a third arm fixedly extending from the second arm, such that the first arm extends over the top face of the counterweight when the arm is in the first position, and extends downward along the right side or the left side of the vehicle when the arm is in the second position, an open end of the U-shape arm faces a width direction of the vehicle when the arm is in the first position, the third arm is supported by the stationary part of the vehicle, such that the arm rotates about an arm rotation axis along a plane vertical to a longitudinal axis of the vehicle.

2. An industrial use vehicle, comprising:

the fuel tank mounting device according to claim 1.

3. The fuel tank mounting device according to claim 1, wherein the first arm is provided with at least two tank fixing members.

4. A fuel tank mounting device of a vehicle for mounting a fuel tank, comprising:

an arm having a fixing member for fixing the fuel tank so as to place the fuel tank over a top face of the vehicle at front or rear side of an operator seat on which an operator sits, wherein the arm forms a L-shape;

the fixing member is provided on one side of the L-shaped arm;

the side of the L-shaped arm provided with the fixing member is placed along a mounting plane of the fuel tank when the arm is in an upper position that corresponds to a position where the fuel tank is mounted on the vehicle;

a corner part of the L-shape arm is placed so as to be in an upper location which is an opposite side of the vehicle where the tank is dismounted to; and a lower end of the L-shaped arm is pivotally supported around an arm rotation axis.

5. An industrial use vehicle, comprising:

the fuel tank mounted device according to claim 4.

6. The fuel tank mounting device according to claim 4, wherein the one side of the L-shaped arm is provided with at least two tank fixing members.

* * * * *